(12) United States Patent
Hung et al.

(10) Patent No.: US 8,283,172 B2
(45) Date of Patent: Oct. 9, 2012

(54) LUNAR DUST SIMULANT CONTAINING NANOPHASE IRON AND METHOD FOR MAKING THE SAME

(75) Inventors: Chin-cheh Hung, Westlake, OH (US); Jeremiah McNatt, Parma, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/711,465

(22) Filed: Feb. 24, 2010

(65) Prior Publication Data

US 2011/0204285 A1 Aug. 25, 2011

(51) Int. Cl.
*C22C 1/05* (2006.01)
*B22F 1/00* (2006.01)

(52) U.S. Cl. ............... 436/19; 75/252; 75/255; 428/402; 436/8; 977/773; 977/778; 977/782; 977/785; 977/810; 977/896

(58) Field of Classification Search .................... 75/255, 75/362–363, 252; 428/402; 436/8, 19; 977/773, 977/778, 782, 785, 810, 896, 963
See application file for complete search history.

(56) References Cited

U.S. PATENT DOCUMENTS

| | | | |
|---|---|---|---|
| 4,948,477 A * | 8/1990 | Gibson et al. | 205/629 |
| 2007/0022839 A1* | 2/2007 | Chi | 75/255 |
| 2010/0159226 A1* | 6/2010 | Suchanek et al. | 428/220 |

OTHER PUBLICATIONS

Hung, C.-C., Carbon, 1995, 33, 315-322.*
Seiferlin, K. et al, Planetary and Space Science 2008, 56, 2009-2025.*
Wallace, W. T. et al, Meteoritics & Planetary Science 2009, 44, 961-970.*

* cited by examiner

*Primary Examiner* — Arlen Soderquist
(74) *Attorney, Agent, or Firm* — Robert H. Earp, III

(57) ABSTRACT

A lunar dust simulant containing nanophase iron and a method for making the same. Process (1) comprises a mixture of ferric chloride, fluorinated carbon powder, and glass beads, treating the mixture to produce nanophase iron, wherein the resulting lunar dust simulant contains α-iron nanoparticles, $Fe_2O_3$, and $Fe_3O_4$. Process (2) comprises a mixture of a material of mixed-metal oxides that contain iron and carbon black, treating the mixture to produce nanophase iron, wherein the resulting lunar dust simulant contains α-iron nanoparticles and $Fe_3O_4$.

7 Claims, 8 Drawing Sheets

LUNAR DUST SIMULANT CONTAINING NANOPHASE IRON AND METHOD FOR MAKING THE SAME

STATEMENT OF GOVERNMENT INTEREST

This invention was made by an employee(s) of the United States Government and may be manufactured and used by or for the Government of the United States of America for governmental purposes without the payment of any royalties thereon or therefore.

FIELD OF THE INVENTION

The present invention relates generally to lunar dust simulants, and more particularly, to lunar dust simulants containing nanophase iron and methods for making the same.

BACKGROUND

Preparing for future lunar exploration makes it imperative to understand the effects of lunar dust on human and mechanical systems. Lunar dust (including that part of the lunar regolith less than 20 μm in diameter) was found to produce several problems with mechanical equipment and could have conceivably produced harmful physiological effects for the astronauts.

For instance, the abrasive nature of the dust was found to cause malfunctions of various joints and seals of the spacecraft and space suits. Additionally, though efforts were made to exclude lunar dust from the cabin of the lunar module, a significant amount of material nonetheless found its way inside. With the loss of gravity, correlated with ascent from the lunar surface, much of the finer fraction of this lunar dust began to float within the cabin and was inhaled by the astronauts.

Therefore, because lunar dust is to be inevitably encountered, it is necessary for studies to be carried out in a variety of disciplines to mitigate the effects of the lunar dust as completely as possible. As such, understanding the physics, chemistry, and toxicity of lunar dust in the lunar environment is essential for current and future lunar exploration.

Several hundred kilograms of lunar soil and rocks were recovered from the numerous moon missions and returned to earth. However, the quantity of lunar dust brought back could never be enough to satisfy the many tests and developments that require its use and study. Therefore, in order to do research on and study the effects of lunar dust, several simulants have been produced to mimic actual lunar dust.

It must be noted, however, that actual lunar dust contains chemically reactive iron nanoparticles, for which no lunar dust simulant has been able to replicate. Therefore, given the extreme environment in which astronauts and their systems operate and the need for those systems to act in a predictable fashion, it is imperative that a lunar dust simulant be created that as closely resembles actual lunar dust as possible.

The synthesis of iron nanoparticles in carbon has been performed previously by Applicant in 1994 and was reported in an article entitled: Ferric Chloride-Graphite Intercalation Compounds Prepared From Graphite Fluoride. Carbon, vol. 33, no. 3, 1995, pp. 315-322; and in an article entitled: Fabrication of Iron-Containing Carbon Materials From Graphite Fluoride. NASA TM-107133, 1996. The chemical process includes exposing a mixture of ferric chloride ($FeCl_3$) and graphite fluoride (CFx) at a temperature at or between 200° C. and 400° C., followed by oxidation at a temperature at or between 600° C. and 700° C., and reduction at a temperature at or between 800° C. and 1200° C. The chemical equation for this reaction is described as reaction (1):

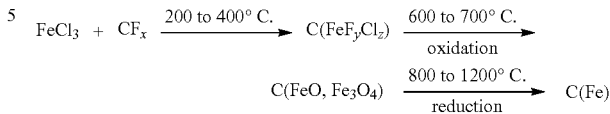

where C(XX) means nanoparticles of XX embedded in carbon.

As shown in FIG. 1, the stability of this product was examined by comparing its x-ray diffraction (XRD) data taken 1 week, 1 year, and 14 years after it was produced, adhered to a glass slide by double-sided adhesive tape and stored in ambient air. This particular sample, C(Fe, FeO, $Fe_3O_4$), was made according to the above-described reaction (1), where the final reduction did not reach completion. The 1-year and 14-year data points were taken from the same instrument at the same setting. From these XRD data, no oxidation of the α-iron nanoparticles can be observed during this 14-year period, since the $Fe_2O_3$ peak continues to be missing, and the FeO and $Fe_3O_4$ peak height relative to the Fe peak became lower as time progressed. This suggests the iron nanoparticles were well embedded in carbon and well protected from the surrounding ambient air.

Additionally, the α-iron nanoparticles appear to become either more ordered or larger in size during the 14-year period, as the width of the α-iron's peak, as shown as (110) in FIG. 1, becomes narrower. This sample was not examined by transmission electron microscopy (TEM). However, a TEM image of its precursor, C($FeF_yCl_z$), as shown in FIG. 2 shows the particle size was in the <10 to 100 nm range. Other TEM images of this precursor show nanoparticles as large as 250 nm.

It was thought that the trace amount of ambient air in nitrogen could be the source of oxygen from which the FeO and $Fe_3O_4$ nanoparticles in reaction (1) are produced. However, trace amounts of air were later found to be insufficient to prevent the iron halide from evaporation. Alternatively, large amounts of air reacted with iron halide quickly to form large $Fe_2O_3$ particles separated from the carbon structure.

SUMMARY

A lunar dust simulant containing nanophase iron and a method for making the same. Process (1) comprises a mixture of ferric chloride, fluorinated carbon powder, and glass beads, treating the mixture to produce nanophase iron, wherein the resulting lunar dust simulant contains α-iron nanoparticles, $Fe_2O_3$, and $Fe_3O_4$. Process (2) comprises a mixture of a material of mixed-metal oxides that contain iron and carbon black, treating the mixture to produce nanophase iron, wherein the resulting lunar dust simulant contains α-iron nanoparticles and $Fe_3O_4$.

BRIEF DESCRIPTION OF THE DRAWINGS

For proper understanding of the written description, reference should be made to the accompanying drawings, wherein.

DETAILED DESCRIPTION OF THE PREFERRED EMBODIMENTS

It will be readily understood that the components of the present invention, as generally described and illustrated in the figures herein, may be arranged and designed in a wide variety of different configurations. Thus, the following detailed description of the embodiments of a lunar dust simulant and methods for making a lunar dust simulant as represented in the attached figures, is not intended to limit the scope of the invention as claimed, but is merely representative of selected embodiments of the invention.

Because the prior process was insufficient to provide the quality or quantity of nanosized iron particles as desired, evidence was development that indicated that nanosized iron oxide in carbon was best produced if the iron halide nanoparticles in carbon oxidized slowly when exposed to either fused quartz (SiO2) or nickel oxide (NiO) powder.

The evidence observed in the lab suggested that, instead of $SiO_2$ or NiO, many other oxides of silicon or metal may also be used as the source of oxygen for the slow oxidation reaction, and, among them, the best oxides to be used would be the ones that result in products that is most compatible to the specific applications. So as to be similar to lunar dust, soda lime glass beads were chosen as the oxygen source because the product would be similar to the lunar glassy regolith, they are widely available, and because they are a mixed oxide of metal and silicon (and therefore would most likely have the desired oxidation reaction). This assisted in the development of Process (1).

An alternate approach to make the needed product starts from the thought that the product needed to be as compatible to the application as possible. That is, the product needs to be similar to the lunar dust. For this reason, the currently available lunar dust simulant JSC-1af was chosen as the reactant for the last part of the Reaction (1) to reduce iron oxide to nanophase iron. This assisted in the development of Product (2). It must be noted that this choice skips the first two parts of Reaction (1), and was based on the following hypothesis that was confirmed by later experiments: (1) The carbon matrix can be replaced by the metal oxide matrix; (2) The reduction reaction can be done by carbon which is mixed into JSC-1af before the 800-1200° C. heating; and (3) JSC-1af is an oxide of silicon and a number of metals, but iron is the only metal oxide to be reduced during the 800-1200° C. heating.

Figure 3:
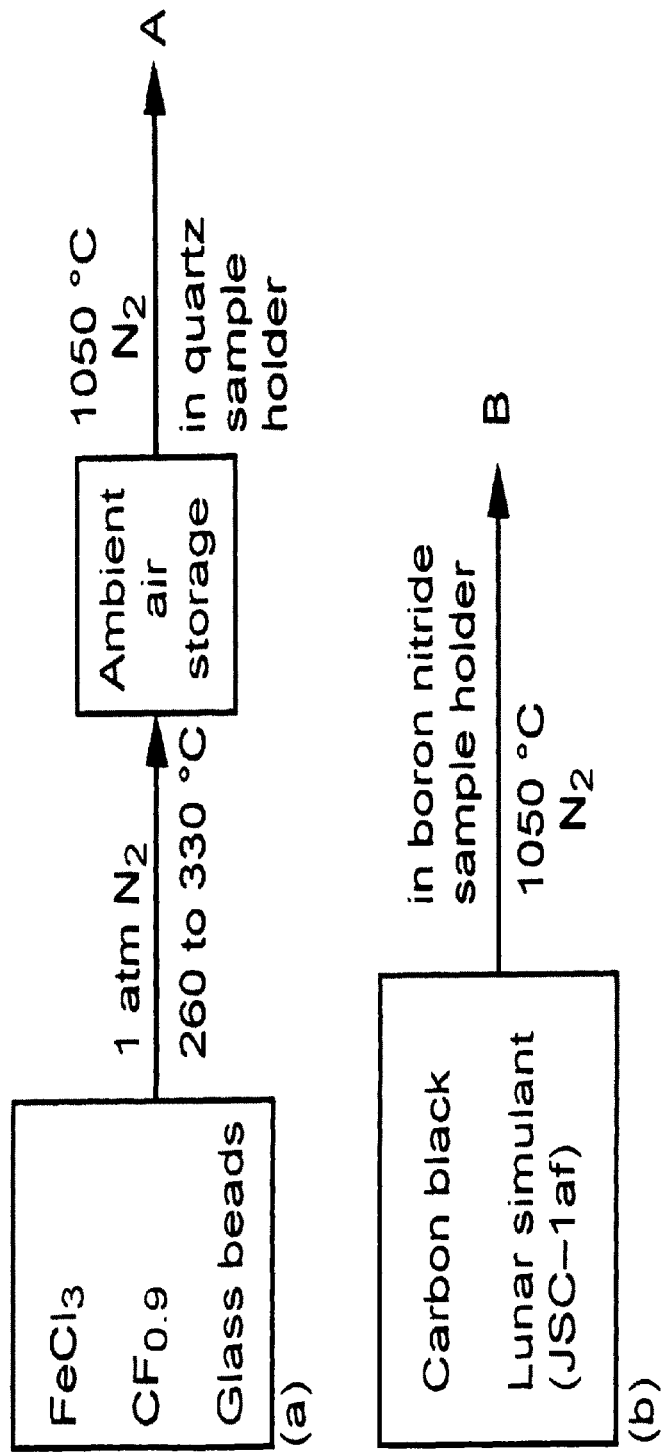
FIG. 3 illustrates (a) Product A from Process (1); and (b) Product B from Process (2).

Two different processes, shown in FIG. 3, are used herein to produce iron nanoparticles for use as a component of lunar dust simulants:

Process (1)—Lunar Glassy Regolith Simulant—generally produces a simulant similar to the actual lunar glassy regolith that contains nanophase iron by sequentially treating a mixture of ferric chloride, fluorinated carbon, and soda lime glass beads at about 300° C. in nitrogen, then treating at room temperature in air, and then treating at 1050° C. in nitrogen. The resultant product include glass beads that are grey in color and can be attracted by a magnet. The x-ray diffraction data indicates that the resultant product contains α-iron nanoparticles, some $Fe_2O_3$, and some $Fe_3O_4$. The lattice structure of the nanoparticles seems to slowly become disordered in ambient air during the 12-month observation period; and Process (2)—Lunar Simulant That Produces α-Iron—generally follows the chemical principles for the above process, but on today's lunar simulant. Process (2) is a reaction that simulates actual lunar dust reacting with carbon in a micrometeorite at the time of impact: this is accomplished by heating a mixture of carbon black and JSC-1af—a lunar simulant candidate of mixed-metal oxides that contain iron—at 1050° C. in nitrogen. The resultant product contains a chemically modified JSC-1 of that can be attracted by a magnet and has a surface layer whose iron concentration increased during the reaction (confirmed by energy dispersive spectrum data). The x-ray diffraction identifies the iron as in the form of nanoparticles of α-iron and $Fe_3O_4$. The nanoparticles appear to grow after the completion of the fabrication process, but are stabilized after 6 months of ambient air storage.

These two process are fully described with reference to the drawings as follows:

Process (1): Lunar Glassy Regolith Simulant. Generally, Process (1) includes sequentially treating a mixture of ferric chloride, fluorinated carbon, and soda lime glass beads at about 300° C. in nitrogen, then treating the mixture at room temperature in air, and then treating the mixture at 1050° C. in nitrogen. The product produces glass beads that are grey in color, can be attracted by a magnet, and contain α-iron nanoparticles (which seem to slowly lose their lattice structure in ambient air during a period of 12 months). Soda lime glass was selected not only because of its oxygen content, but so that the resultant product may have some similarity to the lunar glassy regolith that contains nanophase iron.

More specifically, Process (1) produces Product A when a mixture of $FeCl_3$, fluorinated carbon powder ($CF_{0.9}$), and 0.1 mm soda lime glass beads (mass ratio 0.7:1:1.1) is heated under a nitrogen environment in a glass reactor at a temperature range at or between 260° C. to 330° C. for 1 hour. The product was then placed in ambient air for 50 hour. It was then placed in a quartz sample holder, which in turn was placed in a quartz reactor and further heated in nitrogen at 1050° C. for 1 hour to produce iron nanoparticle products, as described in FIG. 3.

Figure 1:
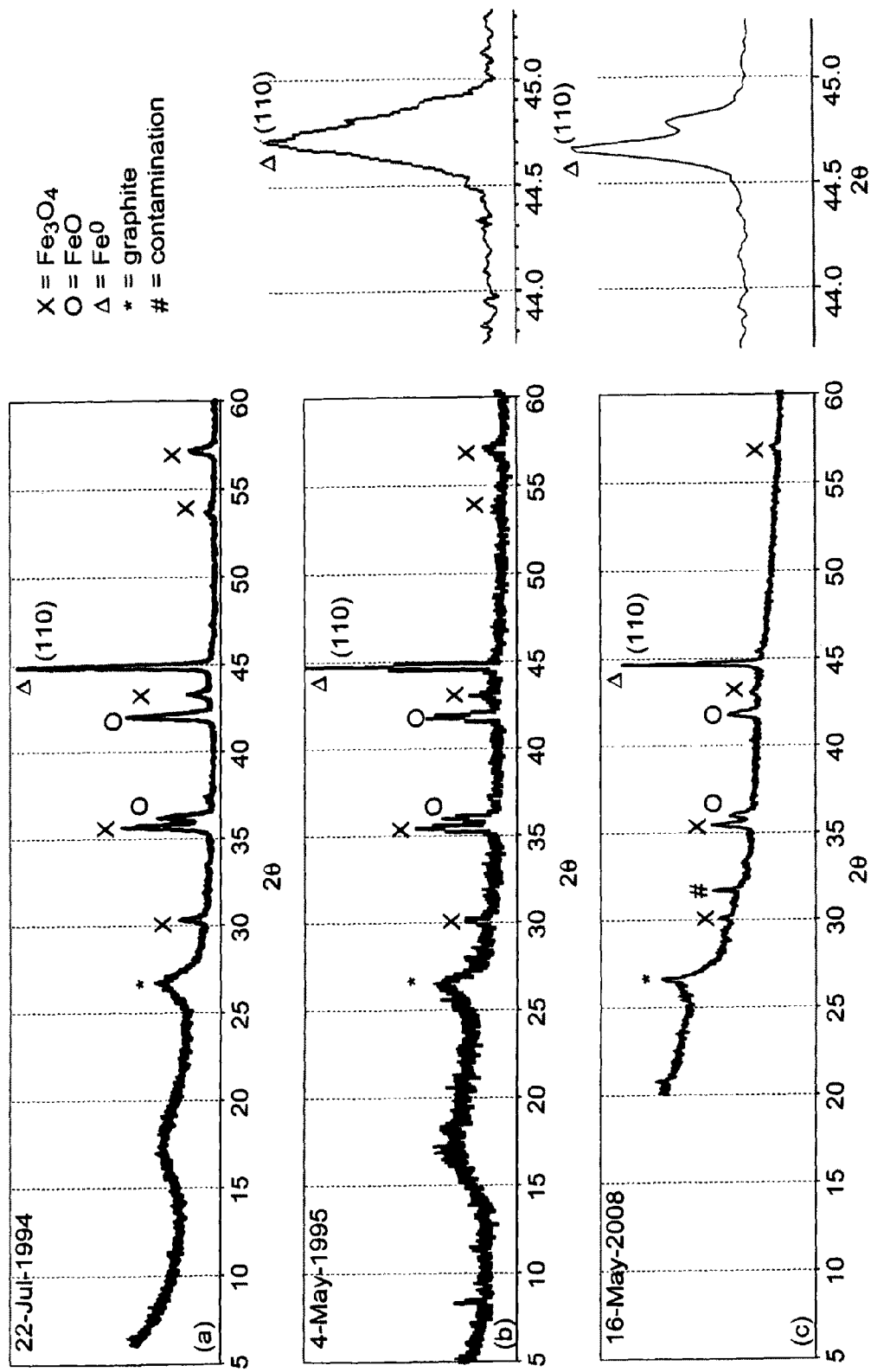
FIG. 1 illustrates x-ray diffraction data of iron and iron oxide nanoparticles in carbon obtained according to reaction (1) at (a) 1 week old; (b) 1 year old; and (c) 14 years old.
Figure 2:
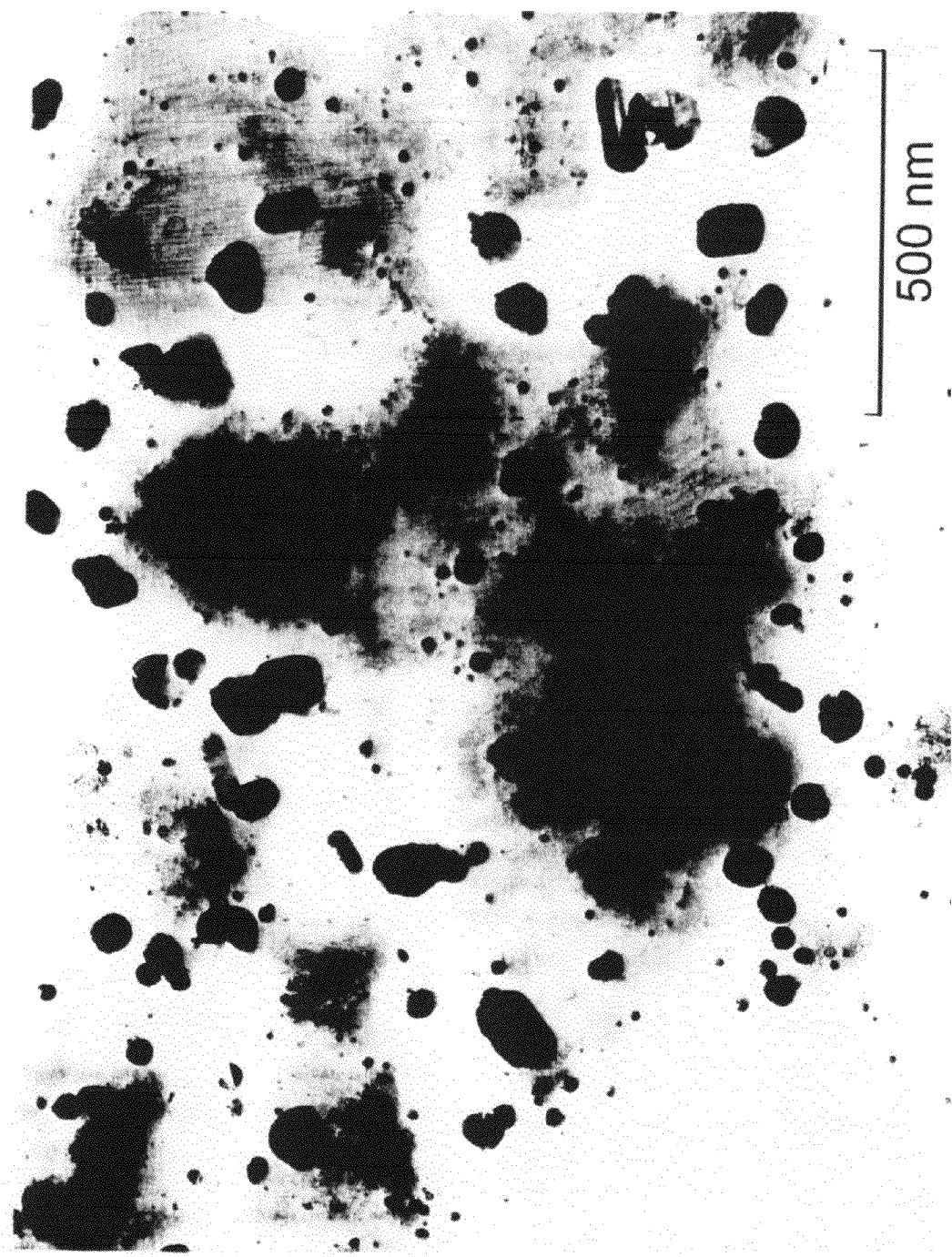
FIG. 2 illustrates a transmission electron micrograph (TEM) of the product resulted from $CF_{0.9}$—$FeCl_3$ reactions at 310° C. in nitrogen. The dark globules are compound of iron.

Process (1) used to fabricate Product A, shown in FIG. 3, is similar to the process to fabricate the product described in FIG. 1. Both processes follow reaction (1), except that Process (1) uses 0.1 mm soda lime glass beads as the source of oxygen during the oxidation reaction, whereas the prior process used the quartz reactor as the oxygen source. It has been observed that the glass beads have more surface area and are in direct contact with the reactant $C(FeF_yCl_z)$. Therefore, the glass beads are more effective in using its oxygen to burn off carbon and oxidize the mixed iron halide. Consequently, a product of glass beads containing α-iron was formed. As a result, most of these beads were still about 0.1 mm in diameter, but were grey in color and could be attracted to a magnet.

Figure 4:
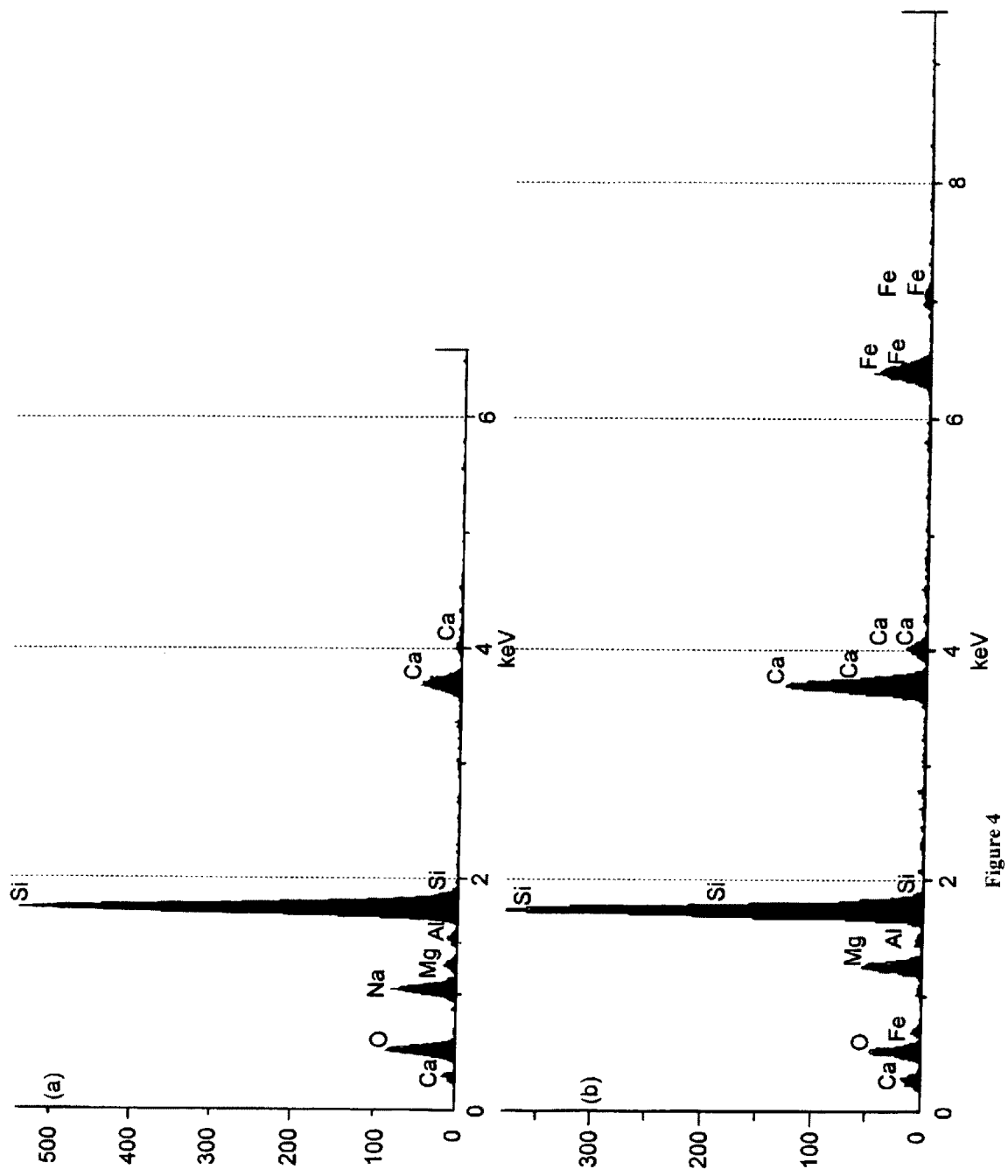
FIG. 4 illustrates the energy dispersive spectra of soda-lime glass bead used in Process (1) reactions that produced iron nanoparticle Product A as described in FIG. 3. (a) Before reaction. (b) 11 months after reaction.

This glass-iron nanoparticle composite appears to have some similarity to the actual lunar glassy regolith, which contains nanophase iron. Its EDS data was examined and compared with that of the precursor: the glass beads before the reactions. The results are shown in FIG. 4. The largest difference between the reactant glass beads and the product glass beads is that the product contains more iron, but less sodium. The iron is believed to be migrated from the reactant $C(FeF_yCl_z)$ to a surface layer on or under the glass bead surface. The sodium, however, is believed to be evaporated after the sodium oxide component in the glass beads releases its oxygen for oxidation of iron and carbon as described in reaction (1). The loss of sodium oxide from the soda-lime glass beads may cause its overall bond strength and softening point to increase. This would explain why the soda lime glass has a softening point of 575° C., but did not soften at the reaction temperature of 1050° C. used herein.

Figure 5:
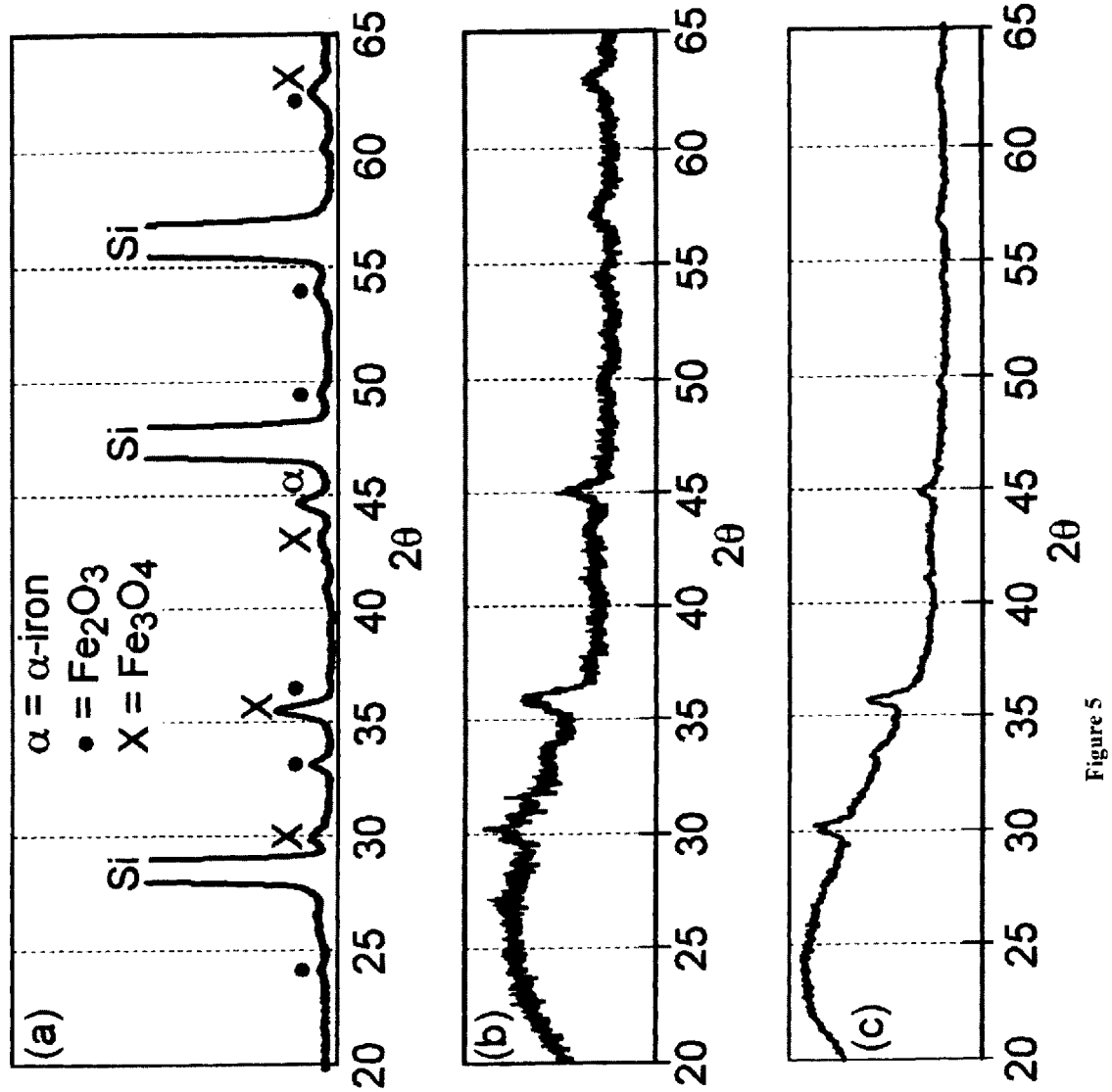
FIG. 5 illustrates x-ray diffraction from Product A in FIG. 3. (a) With silicon standard, 3 months after synthesis. (b) 8 months after synthesis. (c) 11 months after synthesis.

As shown in FIG. 5, the Product A of Process (1) was further examined using XRD to examine its structure 3, 8, and 11 months after the completion of the fabrication reaction. Comparing this FIG. 5 with FIG. 1, both figures contain α-iron and $Fe_3O_4$ peaks. FIG. 5 (XRD of product A) has no carbon peaks, though, and no FeO peaks, whereas it has $Fe_2O_3$ peaks that are absent in FIG. 1. The absence of the carbon peaks suggests most carbon reacted with the oxygen in the glass beads and became either CO or CO2, which agrees with the EDS data: FIG. 4 shows a very small carbon peak. Without sufficient carbon in the sample, the iron oxides are more exposed to the surrounding ambient air. This exposure appears to have resulted in the oxidation of FeO into $Fe_2O_3$ because Product A in FIG. 3 contains $Fe_2O_3$, but not FeO.

Comparing the 3, 8, and 11 month XRD data in FIG. 5, the peaks for the iron nanoparticles seem to be slowly decreasing. These small but apparent changes may possibly be the result of experimental error. However, they may also possibly be true changes caused by the insufficient protection by carbon from the surrounding ambient air and the glass beads. The nanoparticles could slowly react with air or glass beads, lose their lattice structure, and become oxidized during this period.

The α-iron external to the glass beads was removed by further treating Product A in FIG. 3 with 35 wt % HCl at room temperature for 20 minutes, rinsed, and heated to 1050° C. in nitrogen. After such treatment, a small fraction of glass beads could still be attracted by a magnet, indicating some α-iron was present in the glass beads and therefore protected from the HCl attack.

Process (2): Lunar Simulant That Produces α-Iron. Generally, Process (2) involves reducing iron oxides embedded in a host material by carbon. Process (2) includes heating a mixture of carbon black and a mixed metal oxide that includes iron oxide (herein a lunar simulant) at 1050° C. in nitrogen. This process is designed so that the reaction conditions are similar to what the conditions are believed to be when a meteorite hits the lunar surface, since meteorites contain carbon, lunar dust contains iron oxides, and the high temperature would result from the impact. The fact that carbon is in the meteorites but much depleted in the lunar samples suggests the possibility that carbon is at least partly consumed by the mixed-metal oxides in the lunar dusts. The resultant product contains a chemically modified simulant that can be attracted by a magnet and has a surface layer whose iron concentration increased during the reaction. The iron was found to be α-iron and $Fe_3O_4$ nanoparticles, which appear to grow after the fabrication process, but stabilizes after 6 months of ambient air storage.

Process (2), used to fabricate Product B and described in FIG. 3, is a reaction between a mixed metal oxide that includes iron oxide (herein a lunar simulant) and carbon—a reaction of reducing iron oxides embedded in a host material by carbon (see reaction (1)). It is a simulation of a proposed space weathering process where nanophase iron particles on lunar regolith grains are created when carbon-bearing micrometeorites impact lunar regolith. A known lunar simulant, called JSC-1af, which is primarily a silicide containing mixed-metal oxides (including iron oxide), was used in the current process. More specifically, Product B was obtained by placing a mixture of lunar simulant JSC-1af and carbon black (mass ratio 5.3:1) in a boron nitride sample holder, which was then placed under a nitrogen environment in a quartz tube and heated at 1050° C. for 1.3 hours.

Figure 6:
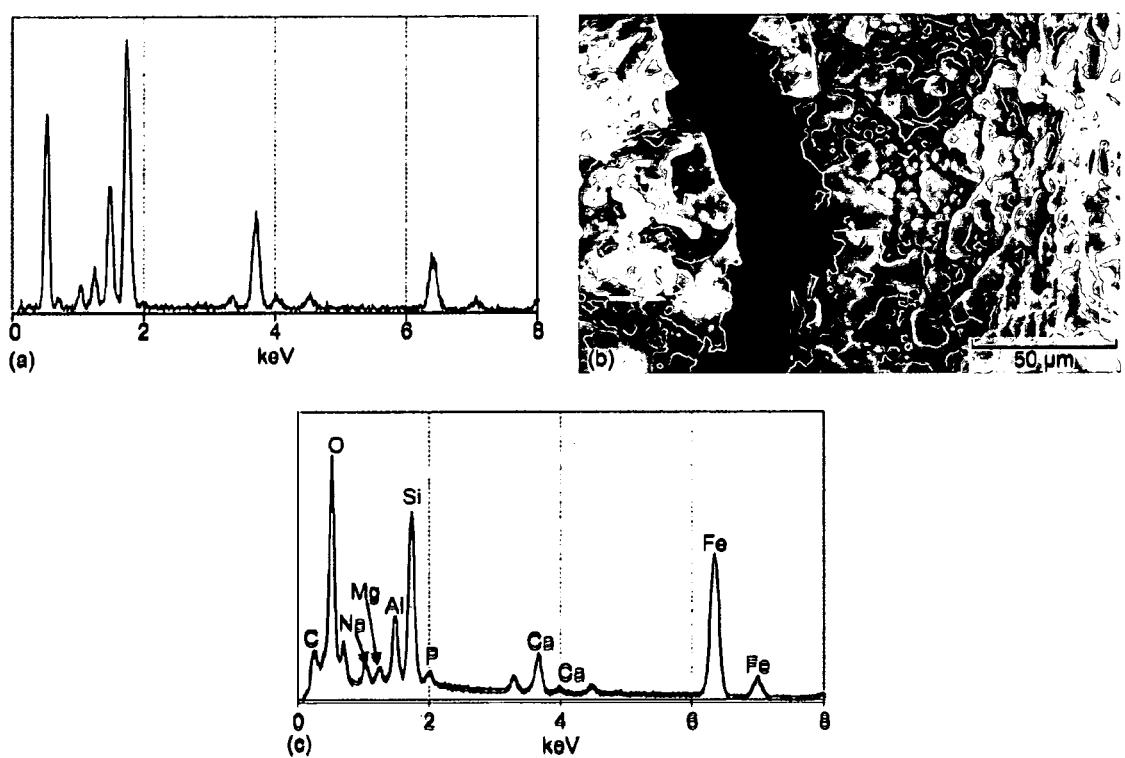
FIG. 6 illustrates energy dispersive spectroscopy (EDS) of reactant and product from Process (2) (see FIG. 3) resulting from reaction of JSC-1af lunar simulant and carbon black product. (a) EDS of JSC-1af reactant. (b) Scanning electron microscope image of Product B, 1 month after synthesis. (c) EDS of Product B taken from areas shown in part (b).

FIG. 6 presents typical EDS data taken from a number of regions included in the accompanying SEM photo of Product B. For comparison, the EDS data for the reactant (JSC-1af) is also included. The most notable difference between the reactant and the product is that the product has higher iron and oxygen concentrations near the surface of the JSC-1af particles, the region that was actually probed by the instrument.

The oxygen concentration increase could be explained as follows: The carbon-JSC-1af reaction would at first remove some oxygen from the mixed oxide, breaking the chemical bonds extensively, resulting in a reactive intermediate product which could then bond to an excessive amount of oxygen when (or if) the product was stored in ambient air after the completion of the process. The increase of iron concentration near the surface of the JSC-1af particles, however, was not expected. It is suggested that during the reactions, immediately after some oxygen atoms were removed by carbon, α-iron would crystallize from the unstable, oxygen-deficient intermediate product. This would cause a reduction of ferrous or ferric iron near the surface and result in diffusion of these ions from the interior to the surface. This suggestion is supported by the fact that the reaction temperature (1050° C.) is only a little lower than the melting point of JSC-1af (1150° C.). Under this condition, the diffusion coefficient of ions in a solid may be high.

Figure 7:
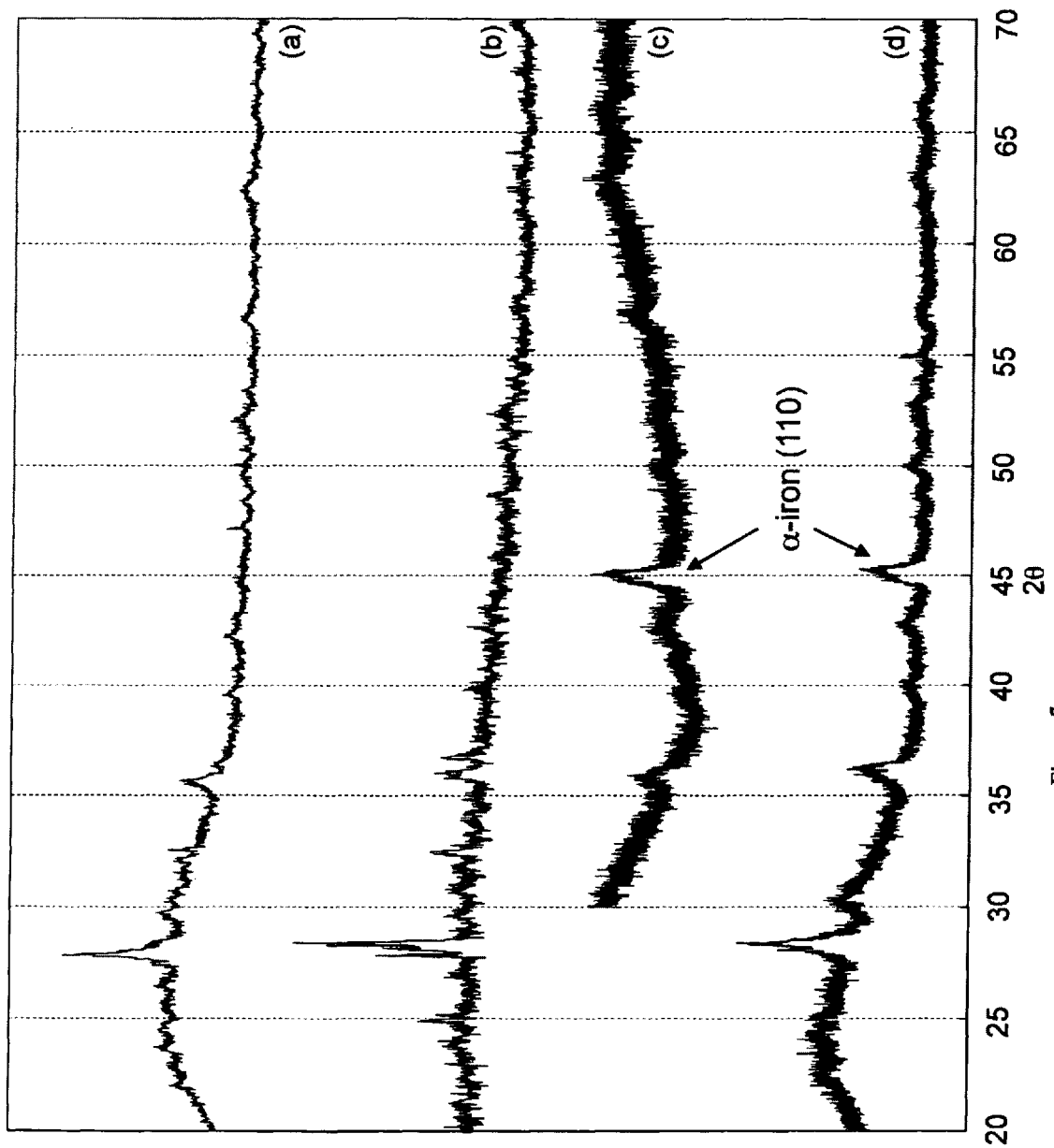
FIG. 7 illustrates x-ray diffraction of reactant and Product B from Process (2) (see FIG. 3) in reaction of JSC-1af lunar simulant and carbon black. (a) JSC-1af reactant. (b) Product B, 1 month after synthesis. (c) Product B, 7 months after synthesis. (d) Product B, 11 months after synthesis.
Figure 8:
FIG. 8 illustrates ferromagnetic dust of product B from Process (2) resulting from reaction of JSC-1af lunar simulant and carbon black. The product lined up into the shape of a papercliff on a piece of paper. Beneath the paper is a papercliff in a magnetic field.

That α-iron present in the product is supported by the fact that the product can be attracted by a magnet immediately after the process is complete and the product exposed to ambient air. However, it is interesting that the α-iron XRD peak (at 2θ near 44° to 45°) was missing when the XRD spectrum was taken the first time, about 1 month after the completion of the process. The α-iron peak did show up in the later scans made 6 and 10 months after the completion of the reactions shown in FIG. 7. At the beginning, the iron might be present as nanoparticles too small to be detected by XRD. Alternatively, the iron may be present initially in a glassy state after partial melting. In either case the nanoparticles grow in size, resulting in the appearance of the XRD peaks.

For comparison, in previous work, nanophase iron particles were found in vapor-deposited olivine produced by pulsed laser irradiation on an olivine sample. That process involved irradiation, heating, evaporation, and condensation. The research presented in this report, however, shows that iron nanoparticles can be formed by heating a lunar simulant with carbon at 1050° C. in nitrogen. This process involves heating, carbon reactions, and perhaps ferrous or ferric ion diffusion in the lunar regolith grains, but not evaporation or condensation. It simulates the reactions between micrometeorites and the lunar regolith grains that are impacted, heated, and nearly melted, but not evaporated. Both processes result from efforts of trying to simulate the complex "space weathering" phenomena on the lunar surface, but have different focuses. The results suggest that the "space weathering" that produces nanophase iron may have more than one kinetic path.

The process of heating alone cannot produce iron from the lunar dust simulant. In an experiment performed for this study, JSC-1af was heated at 1050° C. in nitrogen, without the presence of carbon. The product thus obtained could not be attracted to a magnet and was not further examined.

For either sample made from the reactions described in FIG. 3, the EDS data from different sites (probe size 0.5 to 50 μm range) in the sample invariably show the same element distribution with large peaks of many elements including iron. In addition, both products were ferromagnetic (attracted to a regular magnet), and the XRD data indicate the products contain α-iron. This indicates that particles of α-iron smaller than the probe size (0.5 μm) were produced and distributed over the entire samples.

In an alternative embodiment, other types of mineral grains can also be treated by a similar process to produce iron nanoparticles on the mineral grains. A process similar to Process 2 is disclosed where instead of using the commercial product JSC-1af as the reactant, a nature mineral norite was used. In the following example, iron nanoparticles were produced from norite, a natural product whose melting point is so high that it is was found to be inert to carbon at 1050° C. In this embodiment, the stability of norite's ionic bonds at 1050° C. was reduced by pre-treating it with graphite fluoride ($CF_x$).

A mixture of norite and graphite fluoride (mass ratio 1:0.77) was placed in a quartz sample holder, which was then placed under a nitrogen environment in a quartz tube, and treated sequentially at 400° C. for 2.5 hours, cooled to room temperature, heated to 1050° C. in 85 minutes, kept at 1050° C. for 1.5 hours, and cooled to room temperature. The product can be attracted by a magnet, an indication of the presence of iron.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for making a lunar dust simulant containing nanophase iron, said method comprising:
   mixing ferric chloride, fluorinated carbon powder, and glass beads; and
   treating the mixture to produce nanophase iron, wherein the treatment comprises:
      heating the mixture at or between a temperature of 260° C. and 330° C. for approximately 1 hour in a nitrogen environment;
      oxidizing the mixture for approximately 50 hours in ambient air; and
      reducing the mixture at approximately 1050° C. for approximately 1.3 hours in a nitrogen environment; and
   wherein the resulting lunar dust simulant contains α-iron nanoparticles, $Fe_2O_3$, and $Fe_3O_4$.

2. The method of claim 1, wherein the glass beads are soda lime glass beads.

3. The method of claim 2, wherein heating the mixture under a nitrogen environment is done in a glass reactor.

4. The method of claim 3, wherein during the reducing step, the mixture is placed in a quartz sample holder.

5. The method of claim 4, wherein the quartz sample holder containing the mixture is placed in a quartz reactor.

6. A lunar dust simulant containing nanophase iron comprising:
   a mixture of ferric chloride, fluorinated carbon powder, and glass beads treated to produce nanophase iron by;
   heating the mixture in a nitrogen environment at or between a temperature of 260° C. and 330° C. for approximately 1 hour;
   oxidizing the mixture in ambient air for approximately 50 hours;
   and reducing the mixture in a nitrogen environment at approximately 1050° C. for approximately 1.3 hours; and
   wherein the resulting lunar dust simulant contains α-iron nanoparticles, $Fe_2O_3$, and $Fe_3O_4$.

7. The lunar dust simulant of claim 6, wherein the glass beads are soda lime glass beads.

* * * * *

UNITED STATES PATENT AND TRADEMARK OFFICE
CERTIFICATE OF CORRECTION

| | | |
|---|---|---|
| PATENT NO. | : 8,283,172 B2 | |
| APPLICATION NO. | : 12/711465 | |
| DATED | : October 9, 2012 | |
| INVENTOR(S) | : Hung et al. | |

It is certified that error appears in the above-identified patent and that said Letters Patent is hereby corrected as shown below:

Title Page, Item (75) the correct spelling of the inventor's name is:

Ching-cheh Hung

Signed and Sealed this
Eighteenth Day of December, 2012

David J. Kappos
*Director of the United States Patent and Trademark Office*